US011213113B2

(12) United States Patent
Drew et al.

(10) Patent No.: US 11,213,113 B2
(45) Date of Patent: Jan. 4, 2022

(54) PORTABLE SELF-STANDING HAMMOCK FRAME WITH SHORTENED HAMMOCK AND METHOD FOR SUSPENDING SHORTENED HAMMOCK ON A FRAME

(71) Applicant: Cocam International Enterprises Ltd., Nanjing (CN)

(72) Inventors: Jason Drew, Shorewood, MN (US); Christopher Svensrud, Minneapolis, MN (US); Min Zhuang, Las Vegas, NV (US)

(73) Assignee: Cocam International Enterprises Ltd., Nanjing (CN)

( * ) Notice: Subject to any disclaimer, the term of this patent is extended or adjusted under 35 U.S.C. 154(b) by 197 days.

(21) Appl. No.: 16/501,068

(22) Filed: Feb. 15, 2019

(65) Prior Publication Data

US 2019/0343267 A1  Nov. 14, 2019

Related U.S. Application Data

(60) Provisional application No. 62/762,579, filed on May 10, 2018.

(51) Int. Cl.
*A45F 3/24* (2006.01)
(52) U.S. Cl.
CPC ...................... *A45F 3/24* (2013.01)
(58) Field of Classification Search
CPC ................... A45F 3/24; A45F 3/22
See application file for complete search history.

(56) References Cited

U.S. PATENT DOCUMENTS

| 2,581,623 A | 1/1952 | Benjamin |
| 3,426,367 A | 2/1969 | Bradford |
| (Continued) | | |

FOREIGN PATENT DOCUMENTS

| RU | 2275830 C2 | 5/2006 |
| SU | 1621852 A1 | 1/1991 |

OTHER PUBLICATIONS

International Preliminary Report on Patentability and Written Opinion of the International Searching Authority for corresponding Application No. PCT/US2019/000005 dated Nov. 10, 2020.
(Continued)

*Primary Examiner* — David R Hare
*Assistant Examiner* — Adam C Ortiz
(74) *Attorney, Agent, or Firm* — Miles & Stockbridge P.C.; David R. Schaffer

(57) ABSTRACT

The present invention is generally directed to self-standing structural frames including a fabric that is suspended on the frames. In one aspect, the present invention provides a self-standing framed hammock. The hammock includes: two end bars that connect the x-shaped frames; and at least one panel of fabric suspended between the two end bars of the x-shape; wherein the panel of fabric is gathered and distributed along an end bar that is fixed to the end caps, and wherein the panel of fabric has foam padding to cover the end bar. Wherein the corner end caps have the ability to attach additional frame parts and/or accessories to the frame, and wherein the feet are extended to have two points of ground contact and extend the width of the base footprint of the frame.

16 Claims, 13 Drawing Sheets

(56) References Cited

U.S. PATENT DOCUMENTS

| | | | |
|---|---|---|---|
| 4,542,057 | A | 9/1985 | Breitscheidel et al. |
| 4,679,840 | A | 7/1987 | Fry et al. |
| 4,807,314 | A | 2/1989 | Fry et al. |
| 4,877,288 | A | 10/1989 | Lee |
| 5,097,546 | A | 3/1992 | Turner, III |
| 7,725,965 | B2 | 6/2010 | Sanford-Schwentke |
| 7,895,686 | B1 | 3/2011 | Chen |
| 8,745,782 | B2 | 6/2014 | Bernat |
| 8,750,329 | B2 | 6/2014 | Chheda et al. |
| 9,713,372 | B1 | 7/2017 | Chen |
| 9,750,329 | B1 | 9/2017 | Pinholster, Jr. et al. |
| 9,788,639 | B2 | 10/2017 | Frazer et al. |
| 2007/0079442 | A1* | 4/2007 | Stoll .................. A45F 3/24 5/120 |
| 2007/0277310 | A1* | 12/2007 | Sanford-Schwentke ................. A45F 3/24 5/128 |
| 2009/0013472 | A1 | 1/2009 | Koffler et al. |
| 2018/0116379 | A1 | 5/2018 | Fenton |

OTHER PUBLICATIONS

Official Action and Search Report with English translation dated Jun. 15, 2021 for corresponding Russian Application No. 2020140615.
Partial Supplementary European Search Report for corresponding EP Application No. 19799018.7 dated Nov. 9, 2021.
Notice of Allowance for corresponding MX Application No. MX/a/2020/011932 dated Oct. 29, 2021.

* cited by examiner

PORTABLE SELF-STANDING HAMMOCK FRAME WITH SHORTENED HAMMOCK AND METHOD FOR SUSPENDING SHORTENED HAMMOCK ON A FRAME

This application claims priority benefit of U.S. Provisional Patent Application No. 62/762,579, filed May 10, 2018. The entire content of this application is hereby incorporated by reference herein in its entirety.

FIELD OF THE INVENTION

The present invention is generally directed to self-standing structural frames including a fabric that is suspended on the frames.

BACKGROUND OF THE INVENTION

There have been reports of various hammocks and related methods. For instance, U.S. Pat. No. 9,788,639, entitled "Protective Hammock Enclosure and Method of Use" is allegedly directed to the following: "A hammock enclosure designed for preferably one or two hammocks can be used in a variety of settings and locales due to a number of features of the enclosure. The hammock enclosure has sides made of a high quality netting to prevent insects from entering the enclosure. Additionally, an adjustable, water proof rain fly is positioned above the enclosure and the bottom of the enclosure also comprises a water proof material. The hammock enclosure is affixed, preferably to two trees, and the hammocks then hung inside. The lines for the hammocks pass through openings which may be cinched close to again prevent water, insects, and the like from entering the enclosure. Alternatively, the hammock enclosure may be secured to the ground via loops, an upper loop(s), and a securement mechanism. This enables the hammock enclosure to be utilized as a traditional ground shelter." Abstract.

U.S. Pat. No. 9,750,329, entitled "Multiple-Loop Support Strap and Method for Hanging a Hammock" supposedly reports the following: "A multiple-look support strap is adapted for hanging one end of a hammock from a fixed structure. The support strap cooperates with a like strap to hang an opposite end of the hammock from a second fixed structure spaced apart from the first. The support strap comprises an elongated length of flexible strap folded upon itself to form first and second overlying strap sections. The strap sections are integrally joined together at a first end of the support strap, and a least one of the first and second strap sections terminates at an opposite second end of the support strap. A plurality of strap loops are formed with the first and second strap sections between opposite ends of the support strap." Abstract.

U.S. Pat. No. 9,713,372, entitled "Rounded Hammock" reportedly discusses the following: "A rounded hammock includes a middle panel having a rounded profile and a center. At least four sidewalls, include a first sidewall, a second sidewall, a third sidewall, and a fourth sidewall connected to the middle panel. A first pleat is formed on the first sidewall. A second pleat is formed on the second sidewall. A third pleat is formed on the third sidewall. A fourth pleat is formed on the fourth sidewall. A first pleat cover is stitched over the first pleat. A second pleat cover is stitched over the second pleat. A third pleat cover is stitched over the third pleat. A fourth pleat cover is stitched over the fourth pleat." Abstract.

Despite the various reports, there is still a need in the art for novel hammocks and related methods.

SUMMARY OF THE INVENTION

In one aspect, the present invention provides a self-standing framed hammock. The hammock includes: two end bars that connect the main frame structures; and at least one panel of fabric suspended between the two end bars of the main frame structure; wherein the panel of fabric is gathered and distributed along an end bar that is fixed to the end caps, and wherein the panel of fabric has foam padding to cover the end bar.

In another aspect, the present invention provides a method of constructing a self-standing hammock. The method includes the following steps: gathering a hammock fabric and attaching it to end bars of a self-standing hammock frame; providing a foam pad; sewing an end of the hammock fabric to form a sleeve to slide over an end bar, assembling the foam pad around the end of the hammock fabric with a gap of approximately 1 inch of space between an end of the hammock fabric and an inside length of a foam pad.

In another aspect, the present invention provides a corner end cap that allows additional frame parts to be assembled onto the self-standing frame. The corner end cap includes at least one tube to receive additional frame parts that can be fiberglass and steel frame poles, as well as aluminum or other material frame poles. These additional frame parts can be used to assemble accessories such as but not limited to a mosquito net, tarp, full tent enclosure, single spine-line, or bracing poles. The corner end caps may also include a screw hole to attach additional accessories onto part. These screw-on parts include, but are not limited to, sun shade parts, securing parts, bracing poles, tent support poles, table surface, and lighting.

And yet another aspect, the present invention may include an extended foot that widens the base footprint to provide bracing and support for the hammock frame.

DETAILED DESCRIPTION OF THE INVENTION

Hammocks are well known as a furniture-like device for providing support for an individual to sit, recline, relax or sleep. Hammocks are typically made of fabric material that is at least 7 feet in length and rectangular in shape. This provides enough length to fit the majority of heights of humans within the hammock length. The material is gathered together along the two short ends and secured tightly gathered by some means such as a rope. A spreader bar is sometimes used to hold open the fabric material.

The present invention is a self-standing structural frame consisting of two sets of tubes that cross in an "x-like" shape and are connected together at the top with end bars. Hammock fabric can be suspended between these end bars and typically has the following characteristics: it is gathered together along the length of the end bar, it may be significantly shorter than traditional hammocks (e.g., less than 7 feet in length, less than 6 feet 8 inches in length, less than 6 feet 4 inches in length, or less than 6 feet in length); it has pads at either end that cover the end bars; it provides core body support but allows users to extend their legs off the end of the hammock fabric. The hammock frame can be collapsed, disassembled, or folded down to fit into a carry bag. The unique shape of the frame and suspended fabric lowers and centers the weight to allow for a stable base with a minimal footprint.

In one embodiment, the present invention provides a self-standing structural frame consisting of two sets of tubes that cross in an "x-like" shape is provided. The two sets of tubes are connected together at the top with end bars, which provide structure for the two x-frames and may detach from the frame tubes for collapsing. Hammock fabric is suspended between these end bars. The short side of the hammock fabric is sewn to form sleeve which is then assembled onto the end bar, and the fabric is gathered along the end bars. The end of the hammock fabric includes a foam pad to cover the end bar to allow the user to comfortably extend his legs beyond the end of the hammock frame. This foam pad provides a separate independent function of spreading the center of the hammock fabric open for easy entry.

Figure 1:
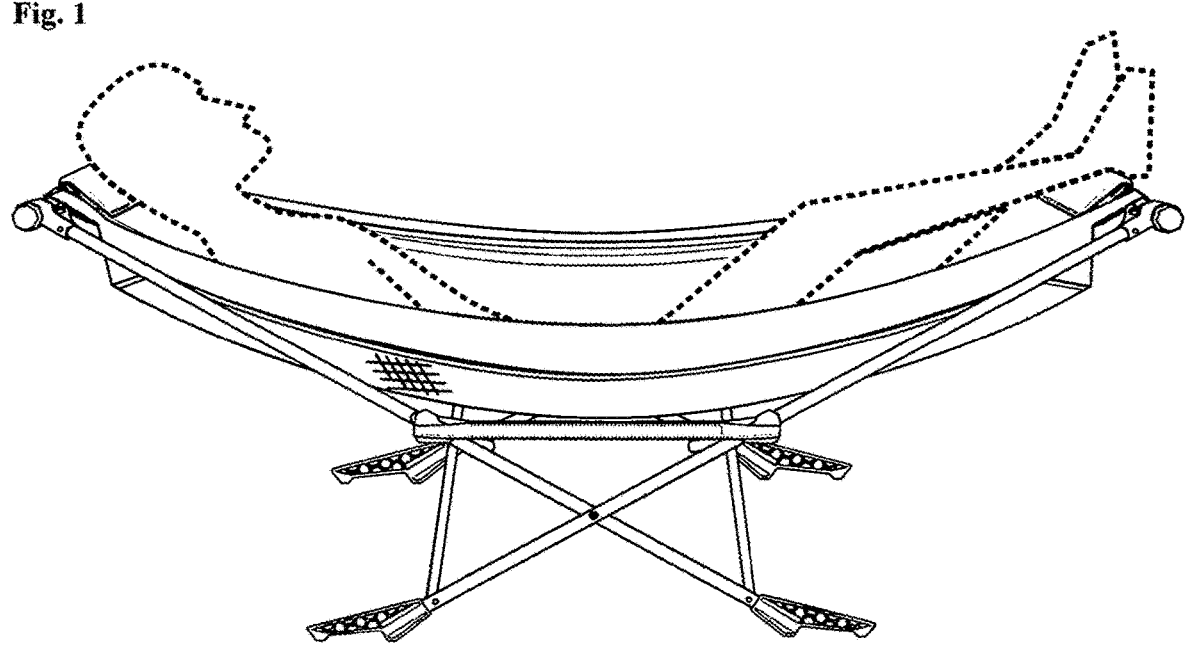
FIG. 1 is a front perspective view of an exemplary embodiment of the present invention in use.

FIG. 1 is a front perspective view of an exemplary embodiment of the present invention in use. As illustrated, the self-standing hammock frame suspends a shortened hammock, providing core body support but allowing users to extend their legs off the end of the hammock fabric.

The shortened hammock has unique end pads that extend over the cross-bar, making extension of a user's legs off the end of the hammock comfortable. This allows a user to keep her shoes on, or keep dirt, sand, snow, etc. out of her hammock.

Figure 2:
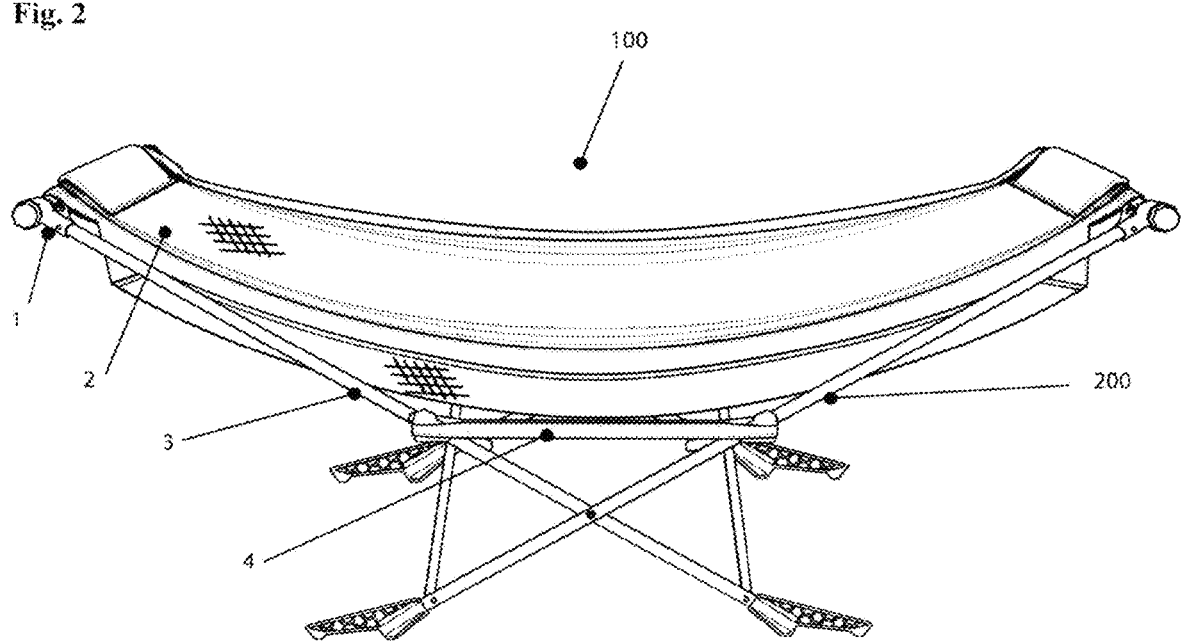
FIG. 2 is a front perspective view of an exemplary embodiment of the present invention.

FIG. 2 is a front perspective view of an exemplary embodiment of the present invention. In this embodiment, the self-standing hammock frame 100 has two identical and reflected sides 200. The sides are made up of frame tubes 3 that are configured in an "x" shape. When paired with the suspended hammock fabric, this "x" shape frame (structural frame) creates a balanced geometry, where the forces pulling the ends together through the hammock fabric pulling the ends "up" are in balanced equilibrium with the gravitational forces pulling the ends "down". The end bars 1 connect the top ends of the frame tubes 3 and provide structural shape to the frame.

The frame tubes are held into a structural "x" shape through a flexible strap 4. Nonlimiting examples of flexible strap materials include webbing, cable, rope, etc. It could also be a hard material such as metal or plastic if hinged or otherwise foldable. The hammock fabric 2 is suspended between the end bars 1. The hammock fabric can be of any suitable material. Typically, it is high strength parachute nylon with triple stitched seams. The hammock fabric 2 is gathered along the end bar 1 shown in FIG. 6. In the embodiment shown in FIG. 2 the frame tubes are disassembled to fold down into its compact form in FIG. 5.

Figure 3:
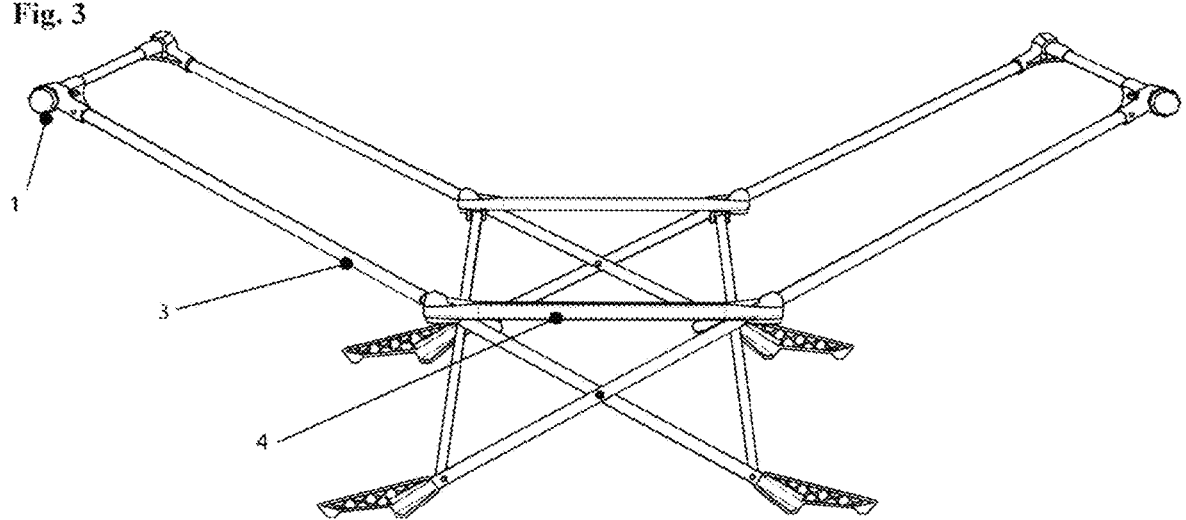
FIG. 3 is a front perspective view of an exemplary embodiment of the frame in the present invention, hammock fabric omitted.

FIG. 3 is a front perspective view of an exemplary embodiment of the frame in the present invention, hammock fabric omitted. This more clearly shows the end bars 1 connecting to the frame tubes 3. The flexible strap 4 connects the x-shaped frame tubes 3 together and provides the brace support to hold the x-shape structure.

Figure 4:
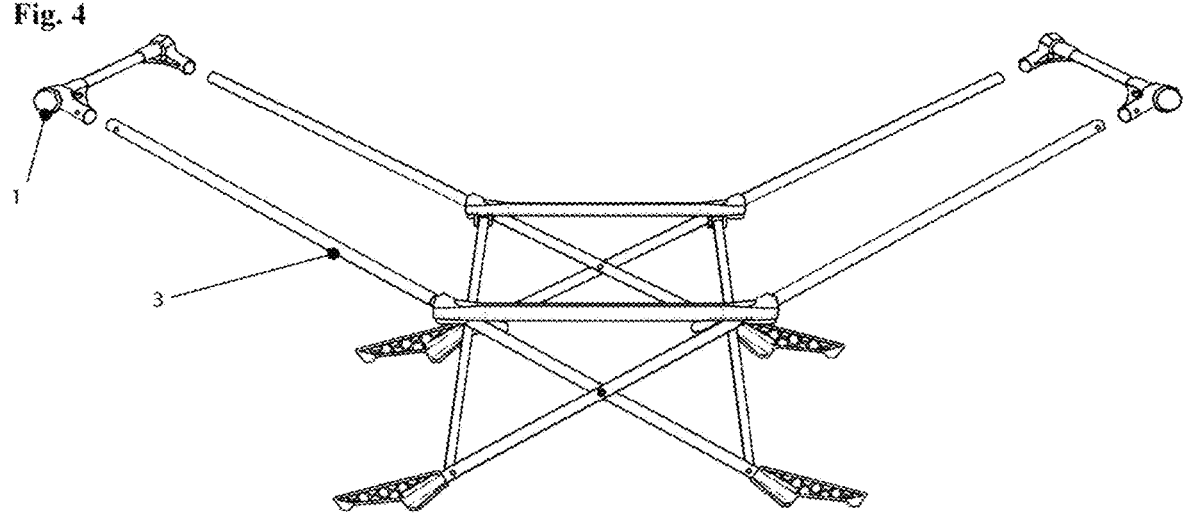
FIG. 4 is a front perspective view of the end bars disconnected from the frame.
Figure 5:
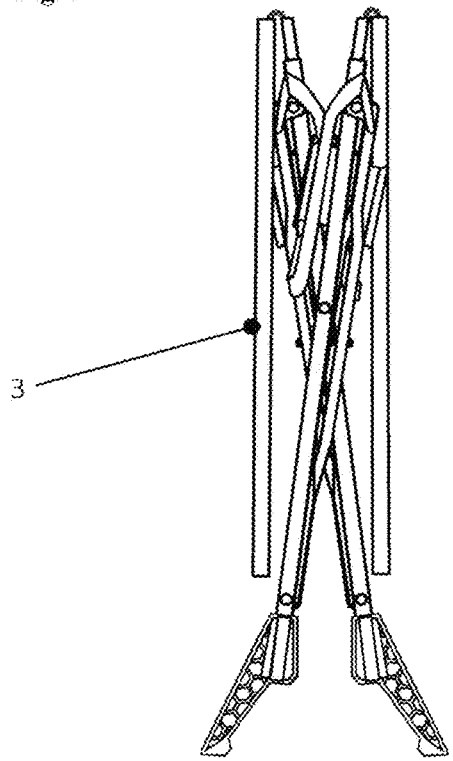
FIG. 5 is a front perspective view of the embodiment of FIG. 2 in its folded form.

FIG. 4 is a front perspective view of the end bars disconnected from the frame. As shown, end bars 1 are disconnected from the long frame tubes 3. This releases the structure of the self-standing frame and allows it to be folded up into its compact form as shown in FIG. 5.

Figure 6:
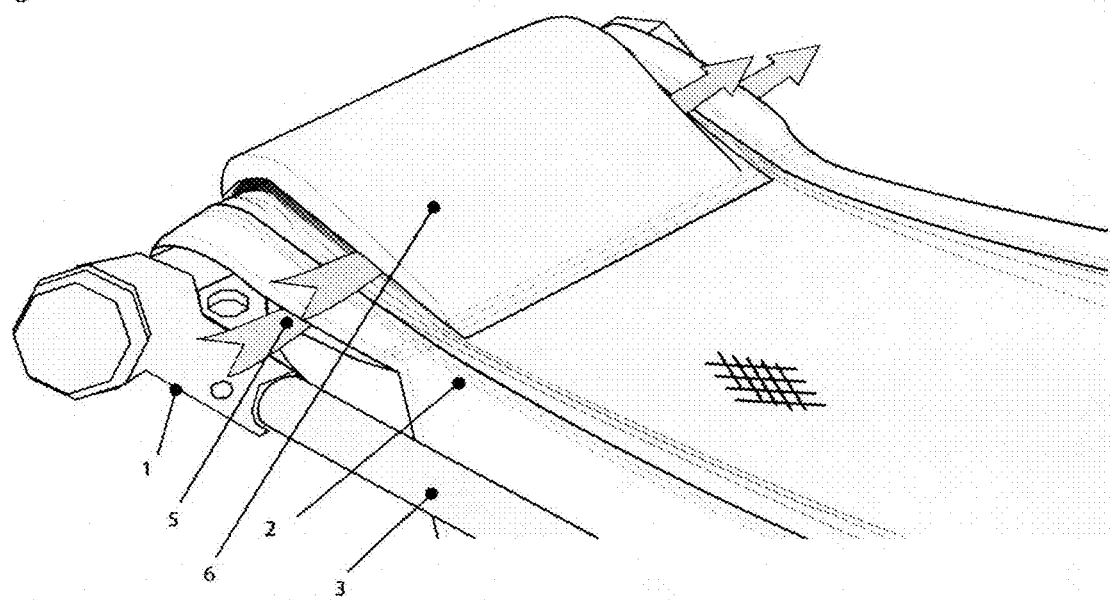
FIG. 6 is a front perspective view of the end bar, hammock fabric, and end pad.

FIG. 6 is a front perspective view of the end bar, hammock fabric, and end pad. A method for suspending the shortened hammock fabric 2 onto the hammock frame is illustrated. The end of the hammock fabric 2 is sewn to form a sleeve 5 that is slid onto the end bar 1. The sleeve is typically loose enough to allow the fabric to slide freely along the end bar, and tight enough to be stopped from slipping over the end corners. Oftentimes a 3" loop is used. The hammock fabric 2 is gathered along the end bar 1. Attached onto the hammock fabric 2 is a foam pad 6 covering the end bar 1. The end pads are typically, permanently sewn onto the hammock fabric. In one case they are 11" wide, providing ample padding for the head and legs of the user. The end pads may extend over the end of the sleeve and loop back under the end bars sleeve to be secured back onto the hammock fabric.

The foam pad 6 is assembled onto the hammock fabric 2 so that there is a gap between the two materials. The gap between the end pads and the fabric sleeve is typically between 0.5 inches and 3.0 inches under application of weight. Oftentimes the gap is between 0.5 inches and 2.0 inches. In certain cases, the gap is approximately 1.0 inch. The end pads are usually held tight without compression. (Compression occurs when the fabric is pulled tight around the pad.) This gap typically allows the hammock fabric 2 to stretch between 0.5 inch and 3.0 inches, or between approximately 1.0 inch and approximately 2.5 inches (e.g., nylon fabric), but it may also be made of a non-stretch fabric (e.g., polyester). The amount of stretch is dependent on the material used as well as the weight applied. Any suitable weight can be applied. Nonlimiting examples of weight than can be applied include: at least 150 pounds; at least 200 pounds; at least 250 pounds; and at least 300 pounds.

Figure 7:
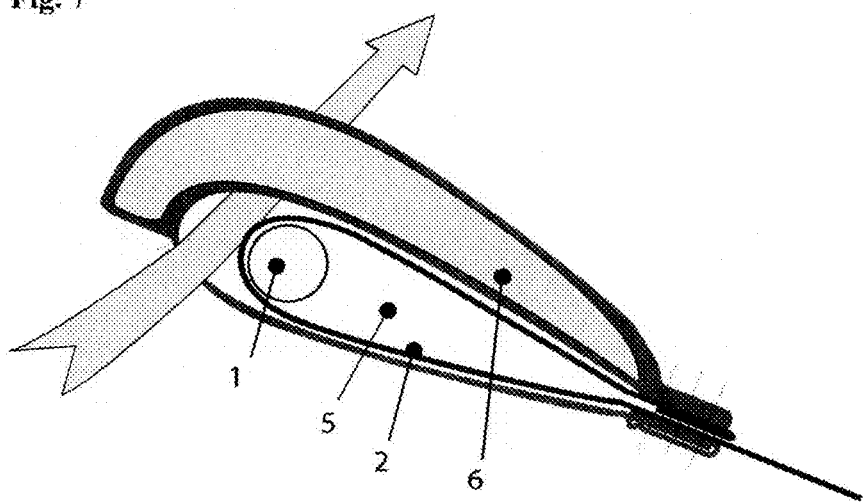
FIG. 7 is a cross sectional view of the end bar and end pad.

FIG. 7 is a cross sectional view of the end bar and end pad. It includes a cross section view of the hammock fabric 2, the end bar 1, and the foam pad 6. The hammock fabric 2 is sewn into a sleeve that slides over the end bar 1. The foam pad 6 is assembled onto the hammock fabric with a gap between the hammock fabric 2 and the foam pad 6.

Figure 8:
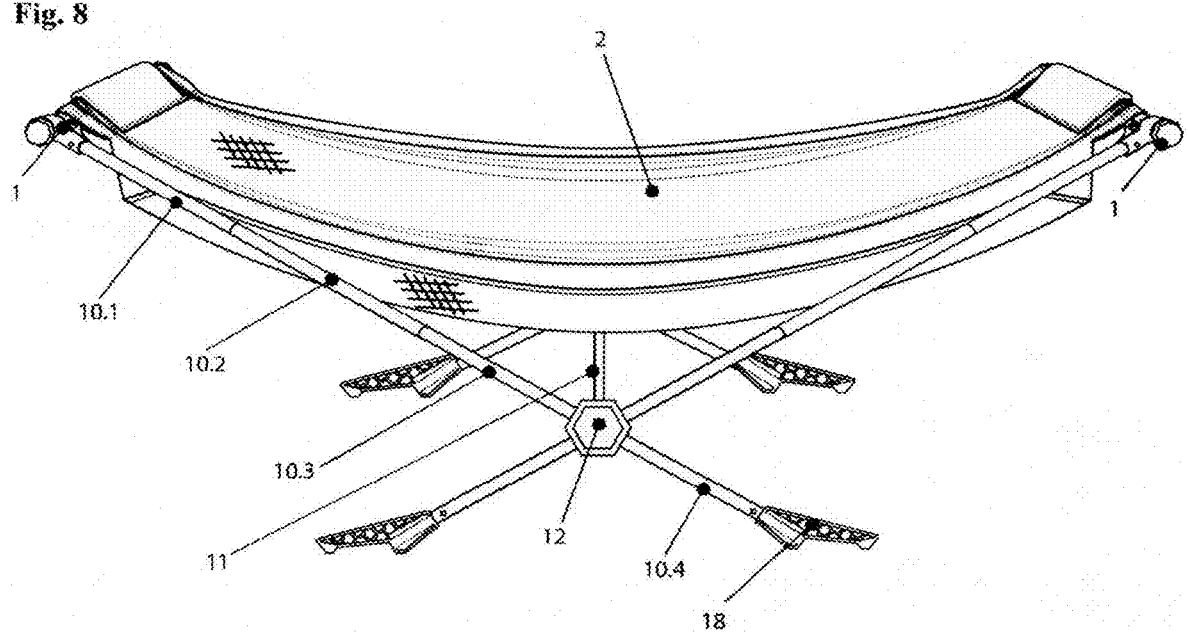
FIG. 8 is a front perspective view of a modified embodiment of the invention.
Figure 10:
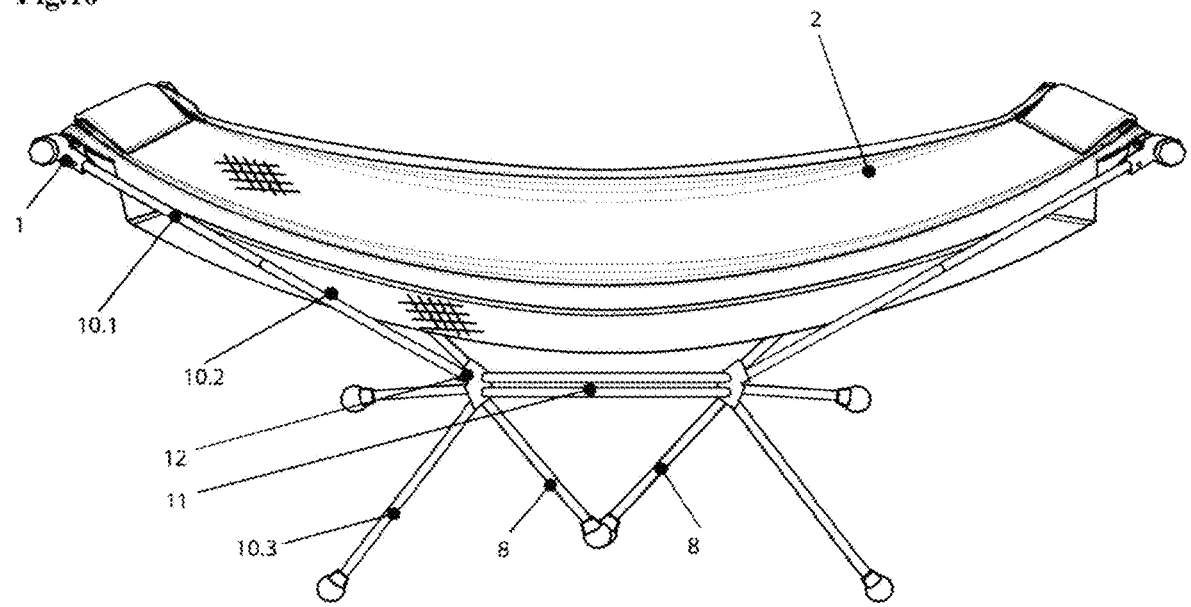
FIG. 10 is a front perspective view of the collapsed version of embodiments 8 and 9.

FIG. 8 is a front perspective view of a modified embodiment of the invention. An advantage of this embodiment is that it will collapse down to a more compact form. The frame tubes are separated into four lengths 10. The top length 10.1, middle upper length 10.2, and bottom upper length 103 are connected into the hub 12 and the lower leg length 10.4. A structural cross tube 11 connects the two hubs 12 together. The method for suspending the shortened hammock fabric 2 onto the frame is shown in FIG. 6 and FIG. 7. The frame tubes can be separated and collapsed down, remaining connected together and connected to the hubs 12 by means of an elastic cord 13 strung through the frame tubes, as shown in FIG. 10.

Figure 9:
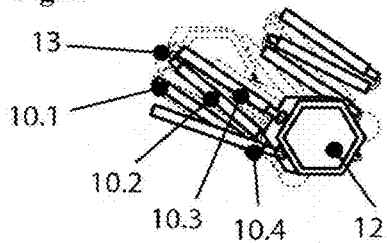
FIG. 9 is a front perspective view of a modified embodiment of the present invention.

FIG. 9 is a front perspective view of a modified embodiment of the present invention. As shown, this embodiment also collapses down into a more compact form. It is an "ultra-portable" model, utilizing high strength and super lightweight aluminum tubes and lightweight hammock fabric to make a lightweight, compact, and easily portable framed hammock that can fit into a standard backpack. In this embodiment the "x" shape structure is at the ends of the hammock fabric. This allows for a wider support base without the need for the bulky feet used on the main embodiment and FIG. 8. An additional leg tube 8 is shown, which provides a tri-pod like base for each end of the frame. A structural cross tube 11 connects the two hubs 12 together. The shortened hammock fabric 2 is suspended between the end bars 1. The method for suspending the shortened hammock fabric 2 onto the frame is shown in FIG. 6 and FIG. 7.

Figure 11:
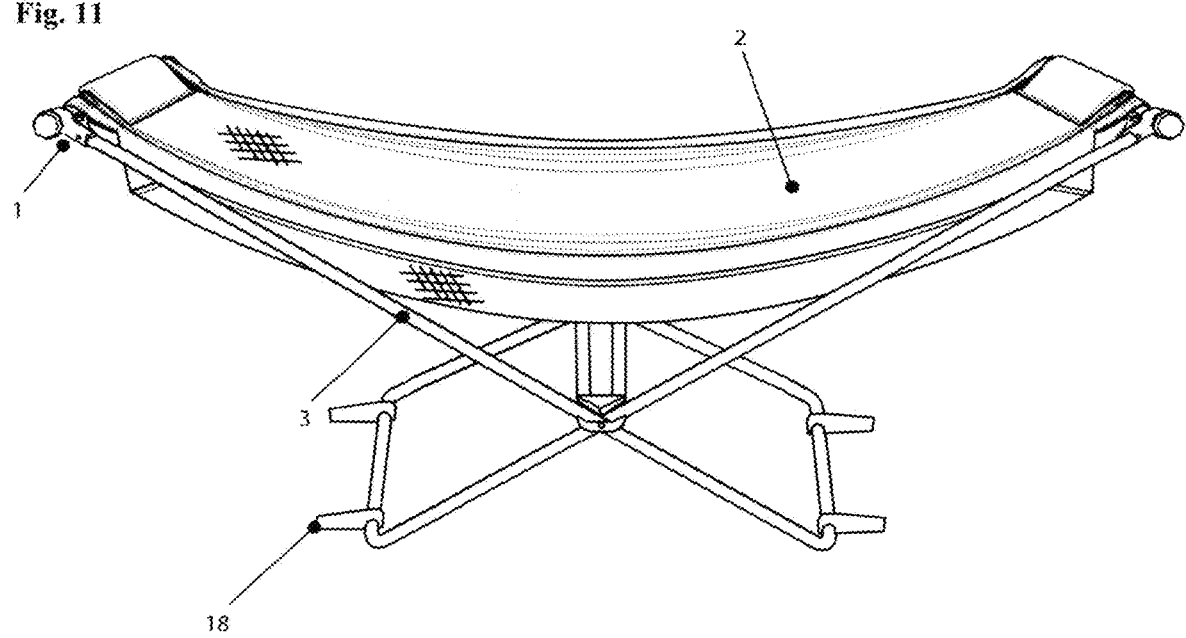
FIG. 11 is a front perspective view of a modified embodiment of the present invention.

FIG. 11 is a front perspective view of a modified embodiment of the present invention. As shown, an advantage of this embodiment is that it is a simple "single folding" frame for products that do not need to focus on compact storage, such as a patio version of the shortened hammock. This construction simply folds in half and stands up on its feet. It is easy to store out of the way on the deck or patio and to pull out and use whenever wanted. In this embodiment the "x" frames are connected at the base as well as by the top end bars. The shortened hammock fabric 2 is suspended between the end bars 1. The method for suspending the shortened hammock fabric 2 onto the frame is shown in FIG. 6 and FIG. 7.

Figure 12:
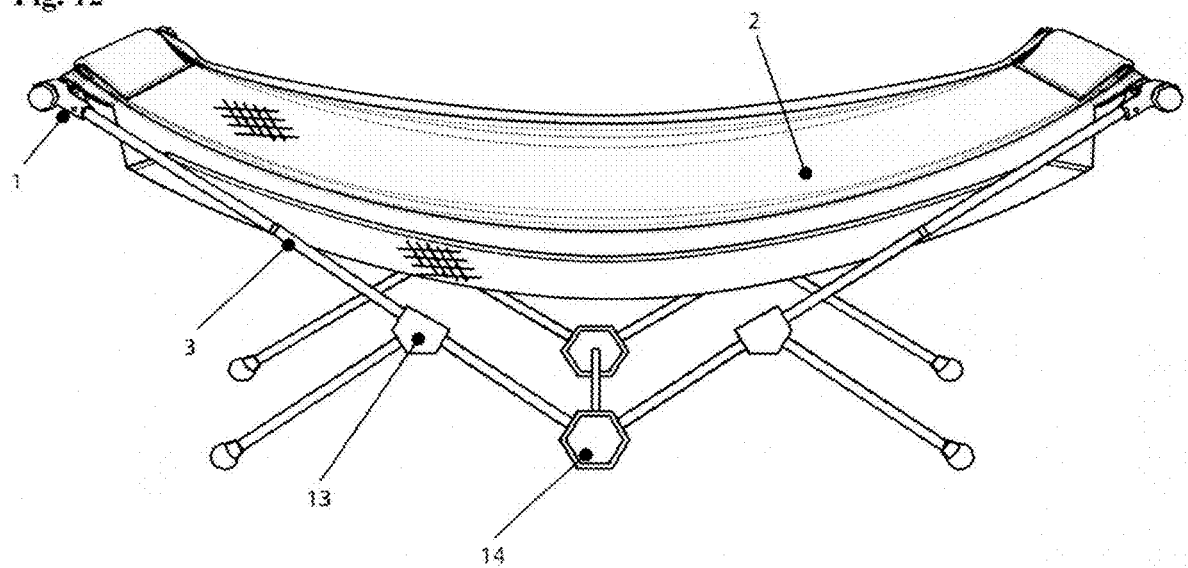
FIG. 12 is a front perspective view of a modified embodiment of the present invention.

FIG. 12 is a front perspective view of a modified embodiment of the present invention. As shown, an advantage of this embodiment is that it allows the hammock to be lower to the ground, like a cot or bed. The structural "x" shape has been modified into a "v" shape (structural frame) base hub 14, and two leg hubs 13 distributed along the frame tubes 3. This allows the hammock lounger to be lower and closer to the ground.

Figure 13:
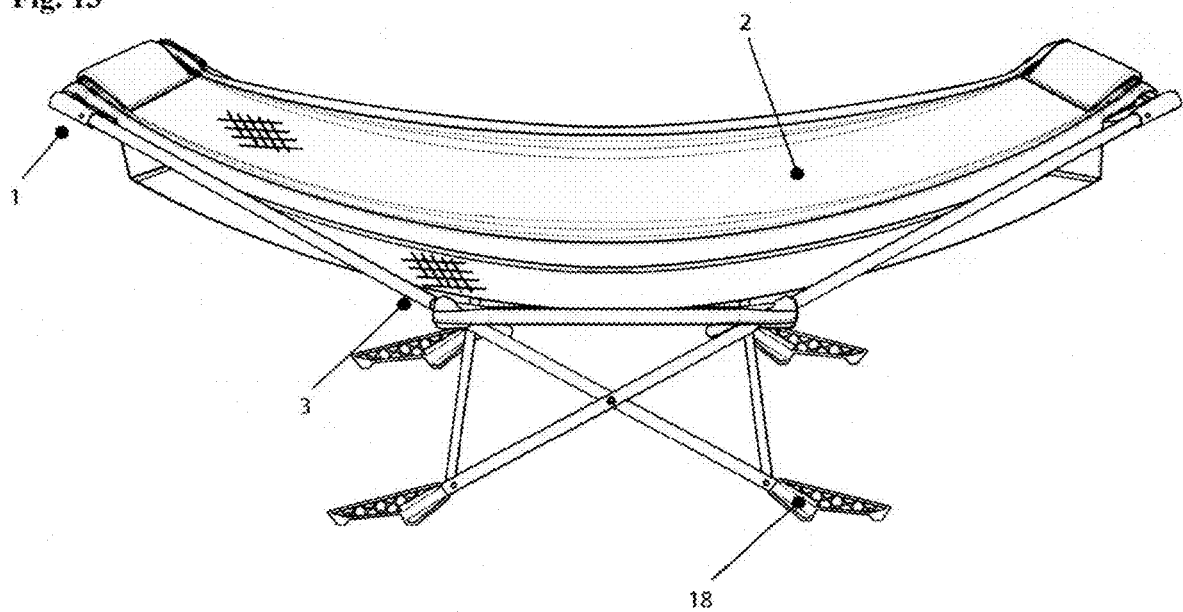
FIG. 13 is a front perspective view of a modified embodiment of the present invention.

FIG. 13 is a front perspective view of a modified embodiment of the present invention. As shown, an advantage of this design is that the end bar that the user feels is a webbing or flexible member rather than a firm bar. This embodiment can provide extra comfort for the head and legs of a user. The modified end bars 1 consist of a bent frame bar underneath and a webbing or other flexible member spanning between the ends of the frame tubes 3. The hammock fabric is assembled onto the webbing or other flexible member utilizing the method for suspending the shortened hammock fabric 2 onto the frame shown in FIG. 6 and FIG. 7.

Figure 14:
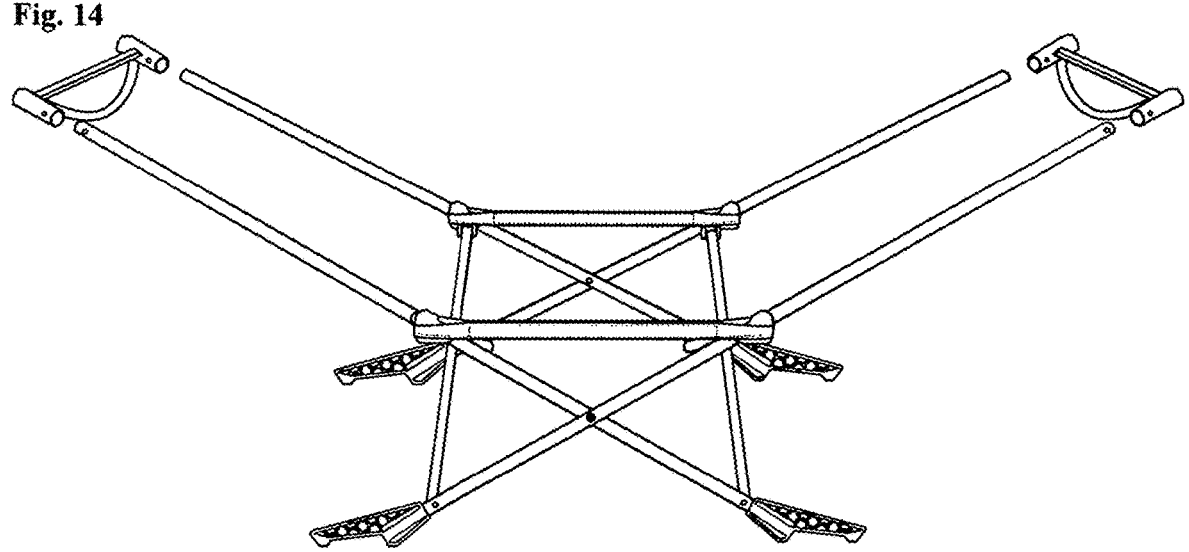
FIG. 14 is the front perspective view of the embodiment in FIG. 13, with the hammock fabric removed to more clearly see the end bars.
Figure 17:
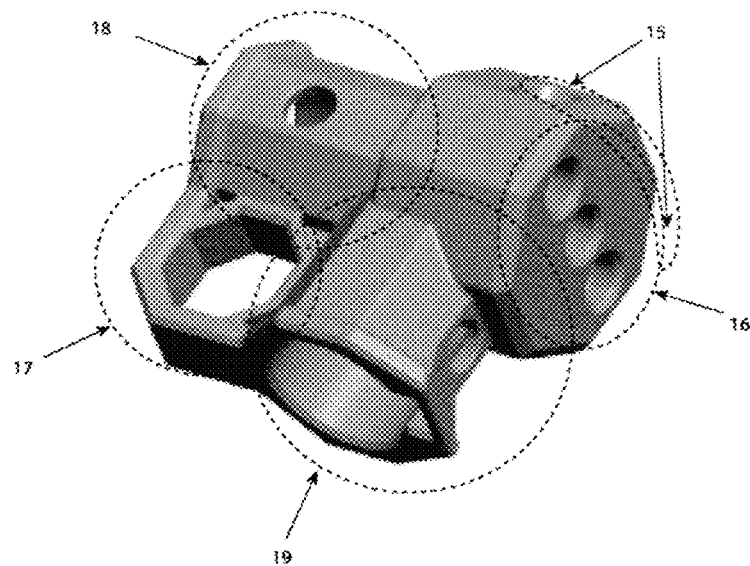
FIG. 17 is a front perspective view of the corner end cap part, with circles indicating the functional areas of the part.

FIG. 14 is a front perspective view of the embodiment in FIG. 17, with the fabric removed to show the structure of the corner end caps and bent frame bar.

Figure 15:
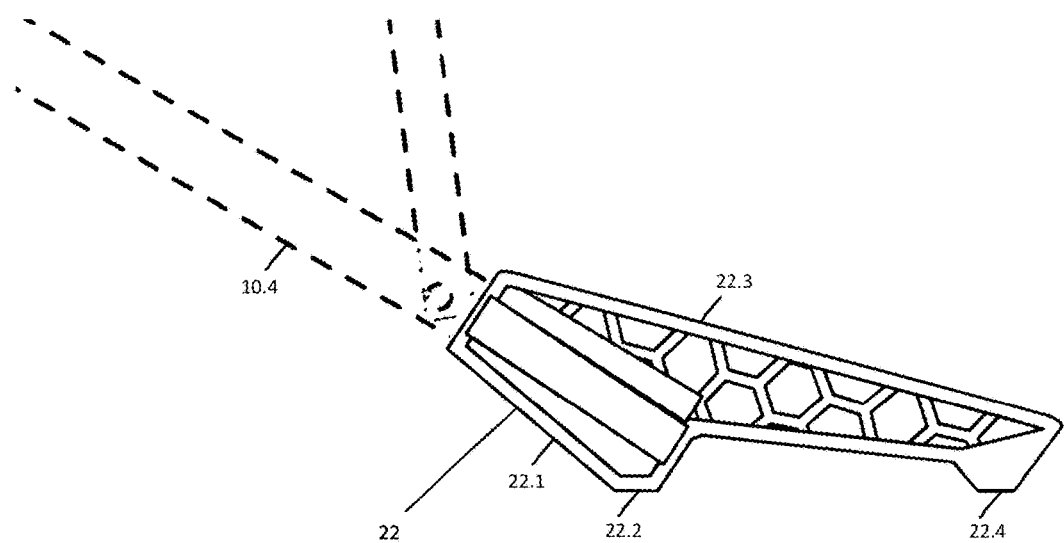
FIG. 15 is a front view of the extended foot.

FIG. 15 is a front view of the extended foot 22, that extends the points of ground contact out wide, to provide bracing and additional support. The extended foot 22 includes a connector portion 22.1 connected to a body portion 22.3. The connector portion 22.1 includes a first flat portion 22.2 on a bottom of the connector portion 22.1 and the body portion 22.3 includes a second flat portion 22.4 on a bottom of the body portion 22.3. These are much like the outriggers used on trucks and trailers. The extended foot 22 creates a wider base and more support beyond the contact points of the frame.

Figure 16:
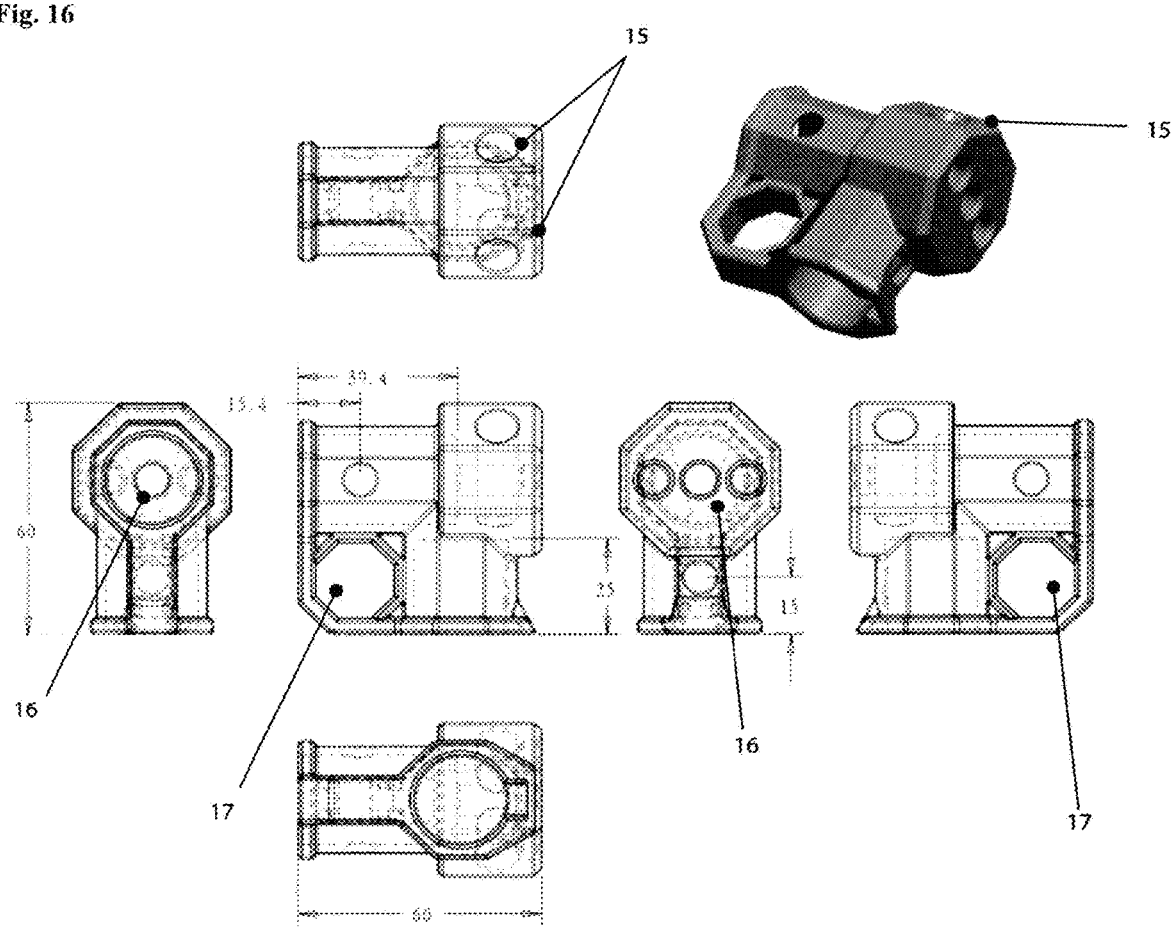
FIG. 16 is a set of views of the corner end cap part.

FIG. 16 is various views of the corner end cap, showing the sockets that allow additional frame parts to be assembled onto the self-standing frame. It includes frame extension sockets 15 that fit fiberglass, aluminum, or other frame poles. The corner end cap part oftentimes includes a socket 16 to allow a screw bolt to attach additional items onto the self-standing frame. The corner end cap may also include a ring 17 or similar method to attach a toggle, string, or other item onto the corner end cap and frame.

FIG. 17 is a front perspective view of the corner end cap piece. The corner end cap piece may have the following connected sections: the end bar receiving socket 18, the toggle ring 17, the frame bar receiving socket 19, the bolt-on socket 16, and the frame extension sockets 15.

Figure 18:
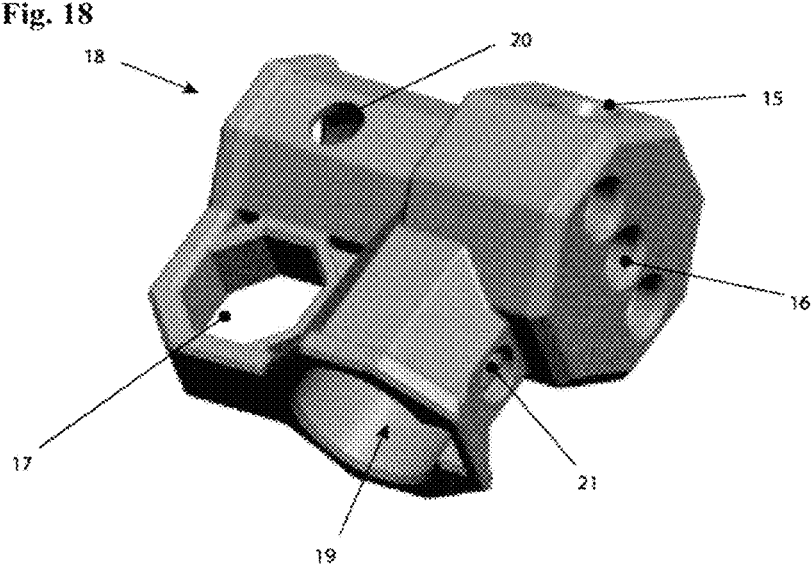
FIG. 18 is a front perspective view of the corner end cap part showing the functional features specifically applied to the part.

FIG. 18 is a front perspective view of one embodiment of the corner end cap piece, showing holes that allow the frame to secure together with pinlocks. The end bar is inserted into the end bar socket 18 and is locked in place with a pinlock that secures into the pinlock hole 20. The frame bar is inserted into the frame bar receiving socket 19, and is locked in place with a pinlock that secures into the pinlock hole 21.

Figure 19:
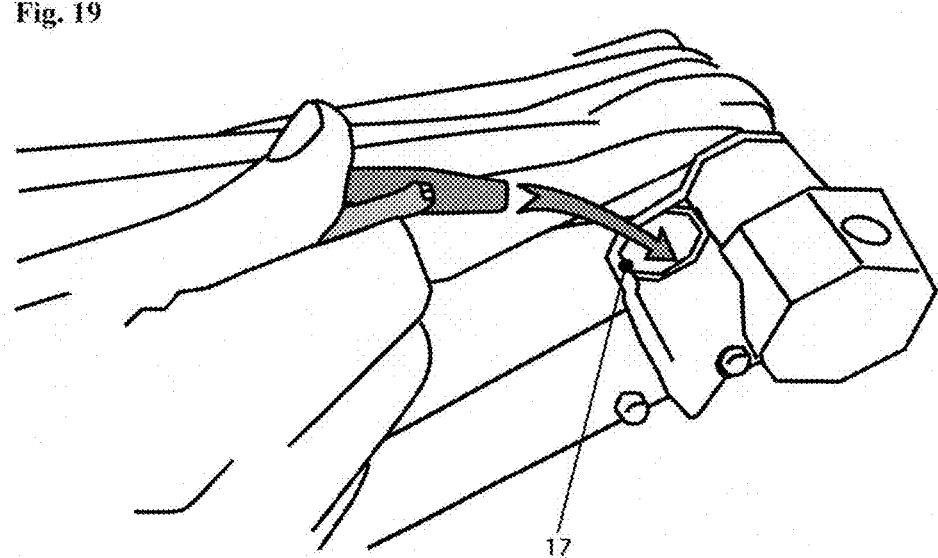
FIG. 19 is a front perspective view of the corner end cap part with the ring to connect accessories by a toggle or similar method.

FIG. 19 is a front perspective view of the corner end caps showing detail of the ring 17 to attach a toggle (shown), or similar method.

Figure 20:
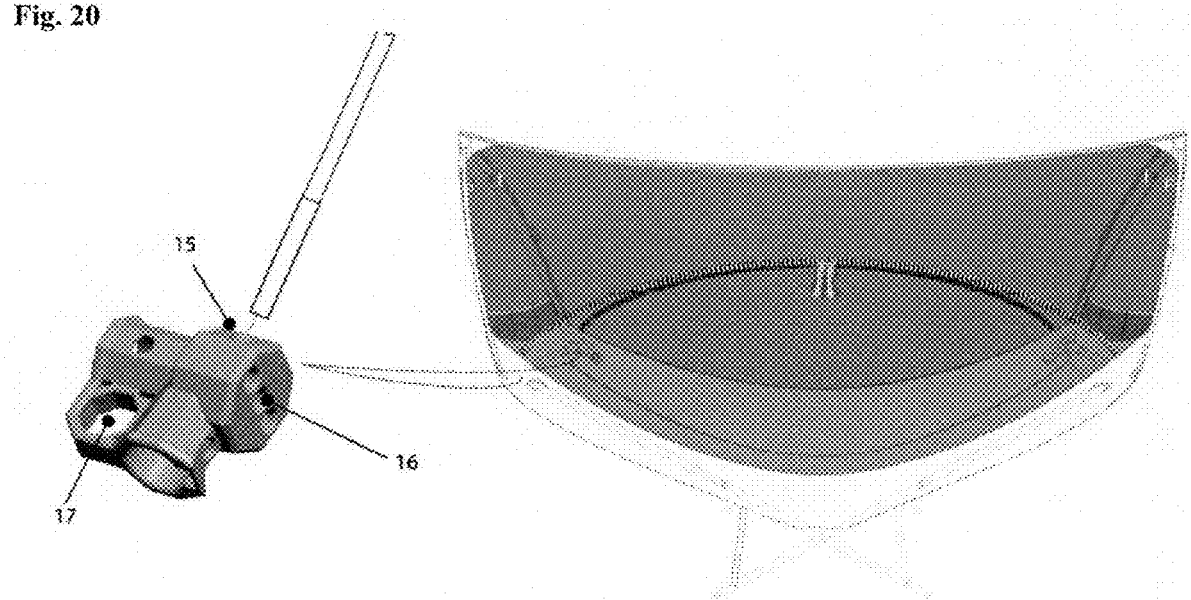
FIG. 20 is a front perspective view of the corner end cap part in use holding the frame for a bug net accessory.

FIG. 20 is a front perspective view of the corner end caps in use, shown with frame extension poles 23 assembled onto the frame extension sockets 15 to extend the frame to allow additional accessories to be assembled onto the frame. These accessories can be and are not limited to bug enclosures 24, sun coverage tarps or shades, rain protection tarps, privacy walls, flags, banners, camp accessory racks, and table surfaces. The present invention incorporates the frame extension poles 23 into one embodiment of a bug enclosure 24 and one embodiment of a sun/rain/privacy tarp 26.

Figure 21:
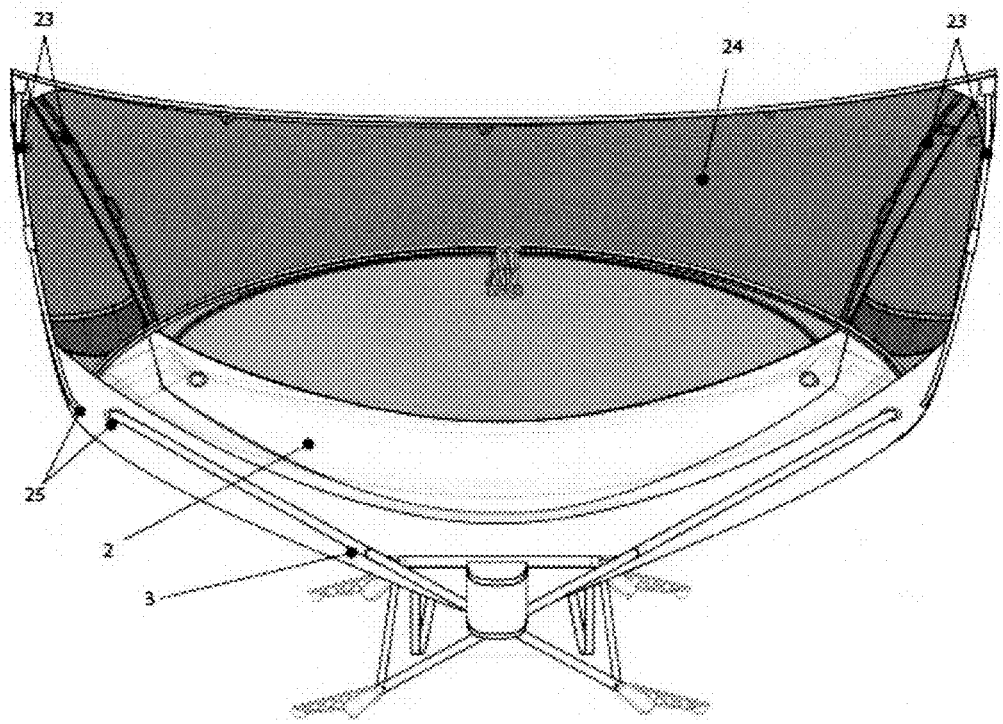
FIG. 21 is a front perspective view of the frame with one embodiment of the bug net attached.

FIG. 21 is a front perspective view of the one embodiment of the bug enclosure 24, showing how the frame bars 3, and the frame extension poles 23 pass through gasket holes 25 in the bug enclosure. This allows the frame bars 3 to pass from outside to inside of the enclosure, where they can connect to the end bar 1 that connects the frame together and holds the hammock fabric 2.

Figure 22:
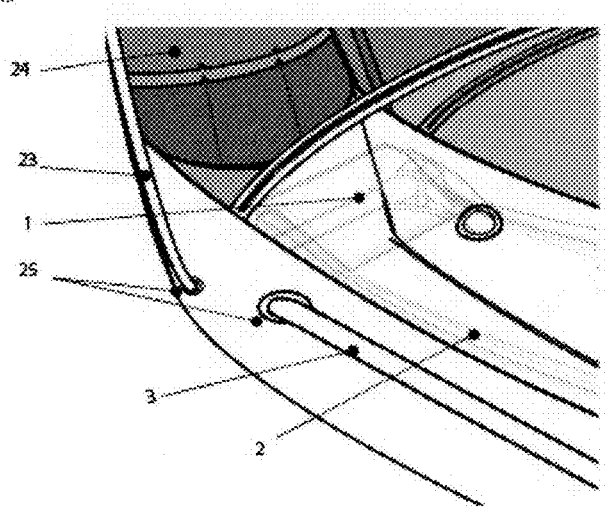
FIG. 22 is a detail perspective view of the method that the bug net allows the frame to pass from outside to inside of the bug net.

FIG. 22 is a detail view of the embodiment of FIG. 21.

Figure 23:
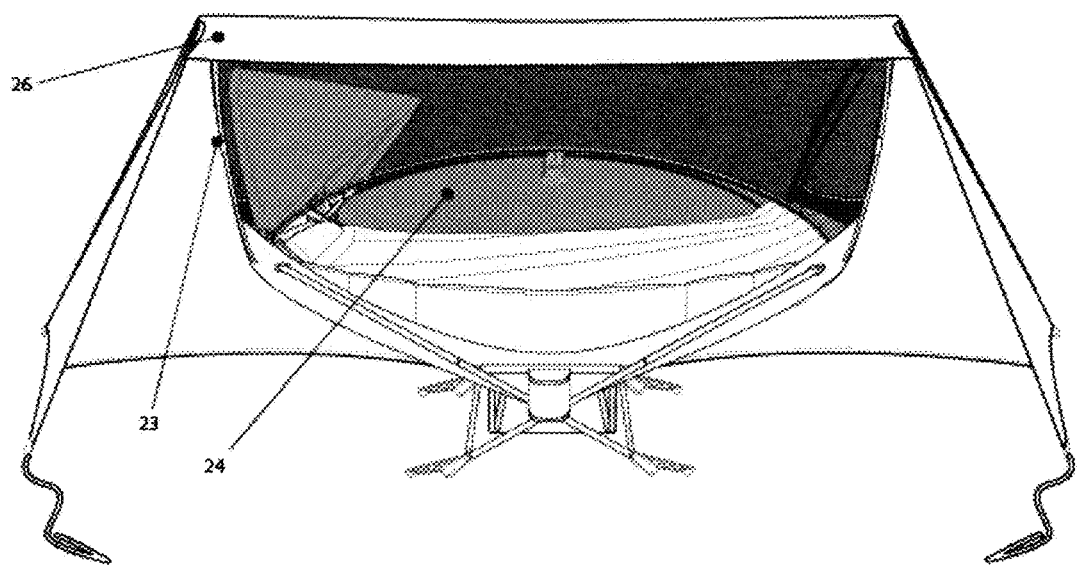
FIG. 23 is a front perspective view of the bug net with the rain tarp connected.

FIG. 23 is a front perspective view of another embodiment of accessory that attaches to the frame by use of the frame extension sockets 15 in the corner end parts. This embodiment is a sun/rain/privacy tarp 26 that attach to the frame extension poles 23. In this embodiment, the tarp 26, sun shade 27, bug enclosure 24, under and over quilts can all be attached to the receiving sockets in the corner end caps independently or in any combination.

Figure 24:
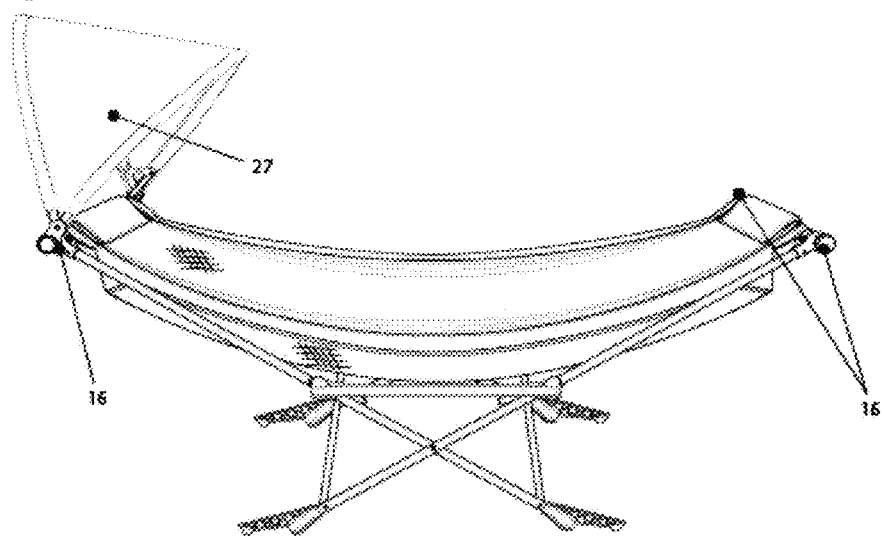
FIG. 24 is a front perspective view of an embodiment of accessory that attaches to the frame.

FIG. 24 is a front perspective view of an embodiment of accessory that attaches to the frame through the bolt-on socket 16, a foldable sun shade 27.

What is claimed is:

1. A self-standing framed hammock comprising:
   a first and second set of tubes that cross in an x-like shape, wherein top ends of the first and second set of tubes are connected, respectively, to a first end bar and a second end bar by means of end caps;
   at least one panel of fabric having a first terminus and a second terminus, wherein the at least one panel of fabric is suspended between the first end bar and the second end bar;
   wherein each tube of the first and second set of tubes includes a foot connected to an end portion of each tube, the foot comprising
      a connector portion connected to the end portion of the tube and the connector portion includes a first flat portion on a bottom of the connector portion, the connector portion configured to position the end portion of the tube above the first flat portion, and
      a body portion connected to and extending away from the connector portion and the body portion includes a second flat portion on a bottom of the body portion, the second flat portion on the bottom of the body portion is coplanar with the first flat portion on the bottom of the connector portion;
   wherein the first terminus and the second terminus of the at least one panel of fabric are gathered and distributed, respectively, along the first end bar and the second end bar and both the first terminus and the second terminus include foam padding that covers the first end bar and the second end bar;
   and wherein the self-standing framed hammock can be collapsed, disassembled or folded down to fit into a carry bag.

2. The self-standing framed hammock of claim 1 wherein the first and second set of tubes are of the same length and the first and second end bars are of the same length.

3. The self-standing framed hammock of claim 1, wherein the tubes are held together in an x-like shape by means of a flexible strap.

4. The self-standing framed hammock of claim 1, wherein the foam padding is attached to at least the first terminus of the at least one panel of fabric such that there is a gap between the padding and the panel.

5. The self-standing framed hammock of claim 1, wherein the first and second set of tubes are separated into four lengths, and wherein the separation of the tubes into four lengths allows the hammock to collapse into a more compact form.

6. The self-standing framed hammock of claim 5, wherein the first and second set of tubes cross in the x-like shape adjacent a top end of a lower led length of the four lengths of each tube in the first and second set of tubes.

7. A self-standing framed hammock comprising:
   a first set of tubes and a second set of tubes connected in an x-like shape,
   a first pair of end caps, each of the first pair of end caps connected to a top end of one of the first set of tubes;
   a second pair of end caps, each of the second pair of end caps connected to a top end of one of the second set of tubes;
   wherein each tube of the first set of tubes and the second set of tubes includes a foot connected to an end portion of the each tube comprising:
      a connector portion connected to the end portion of the tube and the connector portion includes a first flat portion on a bottom of the connector portion; and
      a body portion connected to and extending away from the connector portion and the body portion includes a second flat portion on a bottom of the body portion, the second flat portion on the bottom of the body portion configured to be coplanar with the first flat portion on the bottom of the connector portion; and
   at least one panel of fabric having a first terminus and a second terminus, wherein the first terminus and the second terminus of the at least one panel of fabric are gathered and distributed, respectively, along the first end bar and the second end bar and both the first terminus and the second terminus include foam padding that covers the first end bar and the second end bar;
   the self-standing framed hammock configured to be collapsed, disassembled or folded down to fit into a carry bag.

8. The self-standing framed hammock of claim 7, wherein the second flat portion on the bottom of the body portion and the first flat portion on the bottom of the connector portion are configured to provide spaced apart points of ground contact for each foot.

9. The self-standing framed hammock of claim 7, wherein the second flat portion on the bottom of the body portion and the first flat portion on the bottom of the connector portion are configured to provide a wider base than the end portion of the tube.

10. The self-standing framed hammock of claim 7 wherein the first and second set of tubes are of the same length and the first and second end bars are of the same length.

11. The self-standing framed hammock of claim 7, wherein the tubes are held together in an x-like shape by means of a flexible strap.

12. The self-standing framed hammock of claim 7, wherein the foam padding is attached to at least the first terminus of the at least one panel of fabric such that there is a gap between the padding and the panel.

13. The self-standing framed hammock of claim 7, wherein the first and second set of tubes are separated into four lengths, and wherein the separation of the tubes into four lengths allows the hammock to collapse into a more compact form.

14. The self-standing framed hammock of claim 7, wherein the first and second set of tubes cross in the x-like shape adjacent a top end of a lower leg length of the four lengths of each tube in the first and second set of tubes.

15. A method of constructing a self-standing framed hammock, wherein the method comprises the steps of:
   sewing a first end of hammock fabric to form a sleeve to slide over a first end bar and a second end of hammock fabric to form a sleeve to slide over a second end bar;

gathering the first end of the hammock fabric and attaching it to the first end bar and gathering the second end of the hammock fabric and attaching it to the second end bar;

connecting the first end bar to top ends of a first set of tubes via a first set of end caps;

connecting the second end bar to top ends of a second set of tubes via a second set of end caps and the first set of tubes and the second set of tubes cross in an x-like shape and each tube of the first and second set of tubes includes a foot connected to an end portion of each tube, and each foot comprises:

a connector portion connected to the end portion of the tube and the connector portion includes a first flat portion on a bottom of the connector portion, the connector portion configured to position the end portion of the tube above the first flat portion, and a body portion connected to and extending away from the connector portion and the body portion includes a second flat portion on a bottom of the body portion, the second flat portion on the bottom of the body portion is coplanar with the first flat portion on the bottom of the connector portion;

assembling a first foam pad around the first end of the hammock fabric with a gap of approximately 1 inch of space between the first end of the hammock fabric and an inside length of the first foam pad; and assembling a second foam pad around the second end of the hammock fabric with a gap of approximately 1 inch of space between the second end of the hammock fabric and an inside length of the second foam pad.

16. The method of constructing the self-standing framed hammock of claim 15, wherein the hammock can be collapsed, disassembled or folded down to a more compact form.

\* \* \* \* \*